United States Patent [19]

Ohba

[11] Patent Number: 5,241,372
[45] Date of Patent: Aug. 31, 1993

[54] VIDEO IMAGE PROCESSING APPARATUS INCLUDING CONVOLUTION FILTER MEANS TO PROCESS PIXELS OF A VIDEO IMAGE BY A SET OF PARAMETER COEFFICIENTS

[75] Inventor: Akio Ohba, Kanagawa, Japan

[73] Assignee: Sony Corporation, Tokyo, Japan

[21] Appl. No.: 798,152

[22] Filed: Nov. 26, 1991

[30] Foreign Application Priority Data

Nov. 30, 1990 [JP] Japan ................. 2-338345

[51] Int. Cl.⁵ ............. H04N 9/74; H04N 5/14; H04N 5/208
[52] U.S. Cl. .................... 358/22; 358/166
[58] Field of Search .......... 358/22, 166, 167, 160, 358/180; 382/42

[56] References Cited

U.S. PATENT DOCUMENTS

| | | | |
|---|---|---|---|
| 4,578,812 | 3/1986 | Yui | 358/180 |
| 4,623,923 | 11/1986 | Orbach | 382/42 |
| 4,747,157 | 5/1988 | Kurakake et al. | 358/166 |
| 4,783,840 | 11/1988 | Song | 358/166 |
| 4,885,787 | 12/1989 | Okamoto et al. | 358/167 |
| 5,089,893 | 2/1992 | Iwase | 358/180 |

FOREIGN PATENT DOCUMENTS 2243515 4/1991 United Kingdom.
2245795 5/1991 United Kingdom.

*Primary Examiner*—John K. Peng
*Assistant Examiner*—John W. Miller
*Attorney, Agent, or Firm*—William S. Frommer; Alvin Sinderbrand

[57] ABSTRACT

To process pixels included in a video image, control data is generated to established a pixel processing operation for a pixel under consideration. A set of parameter coefficients is generated in response to this control data; and a convolution filter receives successive pixels of an input video image for convoluting the pixel under consideration as well as surrounding pixels with the set of parameter coefficients, thereby producing a processed pixel which is used by further apparatus in place of the pixel under consideration.

41 Claims, 12 Drawing Sheets

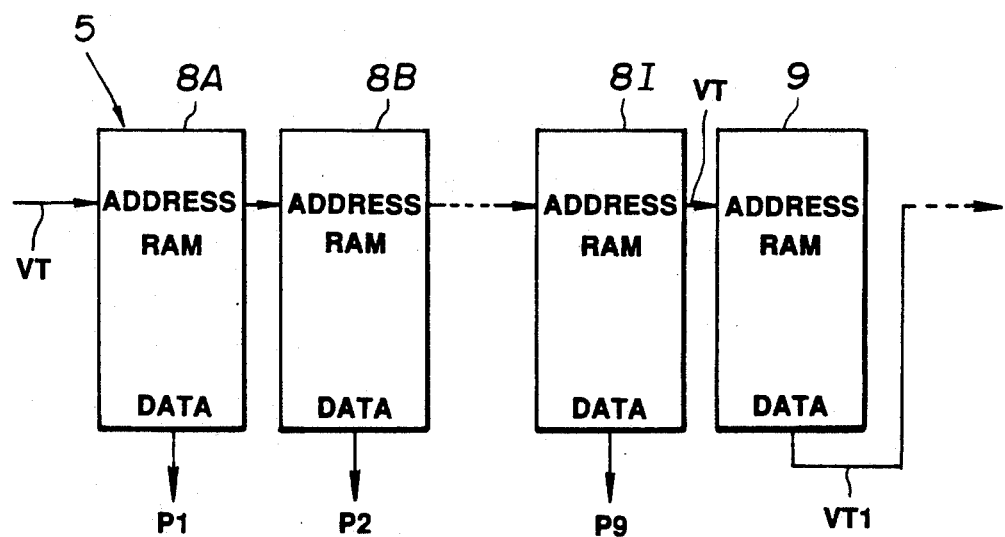

FIG. 8A

|   |   |   | 27 |   |   |
|---|---|---|---|---|---|
| 0 | 0 | 0 | 1 | 1 | 1 |
| 0 | A 0 | B 0 | C 1 | D 1 | 1 |
| 0 | E 0 | F 0 | G 1 | H 1 | 1 |
| 0 | I 0 | J 0 | K 1 | L 1 | 1 |
| 0 | 0 | 0 | 1 | 1 | 1 |

FIG. 8B

|   |   | 28 |   |   |   |
|---|---|---|---|---|---|
| 0 | 0 | -3 | 3 | 0 | 0 |
| 0 | A' 0 | B' -3 | C' 3 | D' 0 | 0 |
| 0 | E' 0 | F' -3 | G' 3 | H' 0 | 0 |
| 0 | I' 0 | J' -3 | K' 3 | L' 0 | 0 |
| 0 | 0 | -3 | 3 | 0 | 0 |

FIG. 8C

|   |   | 29 |   |   |   |
|---|---|---|---|---|---|
| 0 | 0 | -0.3 | 1.3 | 1 | 1 |
| 0 | A" 0 | B" -0.3 | C" 1.3 | D" 1 | 1 |
| 0 | E" 0 | F" -0.3 | G" 1.3 | H" 1 | 1 |
| 0 | I" 0 | J" -0.3 | K" 1.3 | L" 1 | 1 |
| 0 | 0 | -0.3 | 1.3 | 1 | 1 |

FIG.11A

| 0 | 0 | 0 |
|---|---|---|
| 0 | 1 | 0 |
| 0 | 0 | 0 |

FIG.11B

| 0 | 0 | 1/3 |
|---|---|---|
| 0 | 1/3 | 0 |
| 1/3 | 0 | 0 |

FIG.11C

| 1/3 | 0 | 0 |
|---|---|---|
| 0 | 1/3 | 0 |
| 0 | 0 | 1/3 |

FIG.11D

| 0 | 0 | 0 |
|---|---|---|
| 1/3 | 1/3 | 1/3 |
| 0 | 0 | 0 |

FIG.11E

| 0 | 1/3 | 0 |
|---|---|---|
| 0 | 1/3 | 0 |
| 0 | 1/3 | 0 |

FIG.13A
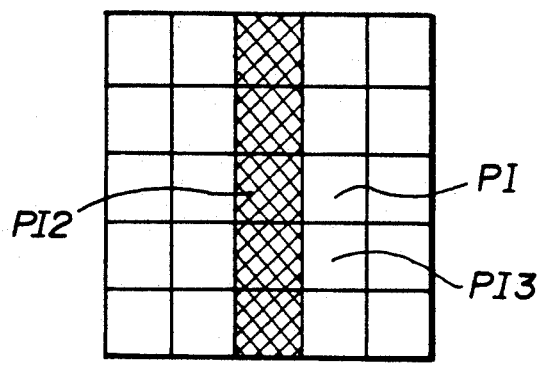
FIG.13B
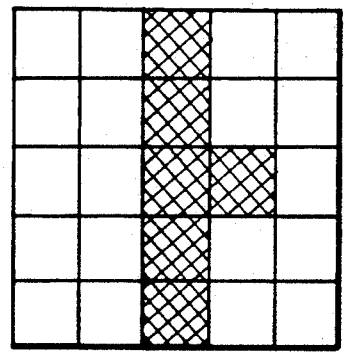
FIG.13C

VIDEO IMAGE PROCESSING APPARATUS INCLUDING CONVOLUTION FILTER MEANS TO PROCESS PIXELS OF A VIDEO IMAGE BY A SET OF PARAMETER COEFFICIENTS

BACKGROUND OF THE INVENTION

This invention relates to image processing apparatus and, more particularly, to such apparatus which employs a convolution filter for processing pixels which constitute a video image.

Image processing techniques have long been used to modify video signal information so as to produce special effects, enhancements and visual modifications of an image produced from a video signal. Advances in integrated circuit technology, such as LSI and VLSI technology, have made it possible to provide circuits that achieve two-dimensional image processing relatively inexpensively and efficiently. Such image processing is referred to generally as two-dimensional processing because it produces effects, enhancements or modifications in both the horizontal and vertical directions of the image.

Examples of two-dimensional image processing apparatus include a low pass filter, a high pass filter and a convolution filter. Convolution filtering of image data is achieved by defining a desired area of the image, such as an area represented by n×n pixels which are centered about a pixel under consideration, by weighting each of the n×n pixels and then by summing the weighted pixels to produce a processed pixel which is then used as the pixel under consideration. Typically, the n×n array is not less than 2×2 and usually may be a 3×3 or other odd-numbered array (i.e. n is an odd number).

Two-dimensional image processing by filtering may be implemented by digital filter techniques. A digital filter is readily adaptable to perform different filtering operations to achieve different effects or enhancements of different images. For example, an adaptive filter may be readily operated, or programmed, to perform one type of filtering operation when the image information supplied thereto represents a scene containing a moving picture image and to perform a different type of filtering operation when the image information represents a scene containing a still picture image.

In many applications, the use of a low pass filter for image processing achieves less than satisfactory results. This is because a low pass filter, even if it were implemented by digital techniques, operates uniformly over the entire video image, which means that certain localized image processing cannot be effected. Similarly, the use of a high pass filter makes it difficult, if not impossible, to achieve localized processing of an image. In addition, the inherent nature of a low pass filter tends to lose or degrade critical edge information; while the inherent characteristics of a high pass filter may result in what visually appears to be a rough area caused by emphasized noise components, even though the image area itself is represented by intrinsically smooth luminance transitions.

Difficulties and drawbacks also are present when a relatively simple convolution filter is used to process image information because non-linear processing and other rather complicated processing techniques are not readily achieved. A typical adaptive filter is relatively complex and, generally, is controlled monotonically. Thus, the localized processing abilities of such an adaptive filter are not easily changed. Consequently, an adaptive filter which may be used for one type of image processing is not easily converted to carry out a different type of image processing.

OBJECTS OF THE INFORMATION

Therefore, it is an object of the present invention to provide image processing apparatus which overcomes the aforenoted drawbacks, disadvantages and difficulties.

Another object of this invention is to provide image processing apparatus which is capable of performing various different types of localized processing simply by making relatively simple, straightforward changes therein.

A still further object of this invention is to provide image processing apparatus capable of achieving special effects, enhancements and/or modifications of an input image without requiring a complex structure to do so.

These and other objects, advantages and features of the present invention will become readily apparent from the ensuing detailed description, and the novel features will be particularly pointed out in the appended claims.

SUMMARY OF THE INVENTION

In accordance with this invention, video image processing apparatus is provided for processing pixels which comprise a video image. A control data generator generates control data to establish a particular pixel processing operation for a pixel under consideration, and a parameter generator responds to this control data for generating a set of parameter coefficients which are supplied to a convolution filter along with the pixel under consideration as well as pixels included in an input video image that are in surrounding relation to the pixel under consideration. The convolution filter convolutes the received pixels with the parameter coefficients and thereby produces a processed pixel.

In one embodiment, the control data generator is comprised of a storage device which stores preset control data values associated with the pixels of the input video image. For example, the storage device may map the control data values onto an array representative of the input video image. As another example, the storage device may comprise a frame memory for storing a frame (such as a video frame) of control data values, each value corresponding to a pixel location in the input video image.

As one aspect of an embodiment of this invention, the parameter generator may comprise an addressable memory, such as a RAM for storing plural sets of parameter coefficients, a particular set being addressed and, thus, read out, by the control data.

In another embodiment, the control data generator is comprised of a stored array of predetermined control values which represent different patterns, whereby the convolution filter effectively mixes different input video images in accordance with the predetermined patterns to produce a composite, mixed image.

In accordance with a still further embodiment, the control data generated by the control data generator represents a geometric pattern, such as a circular pattern, and the convolution filter effectively superimposes that pattern onto the input video image to produce a spotlight effect.

In another embodiment, the control data generator operates to detect an edge, or boundary in the input video image and selects parameter coefficients such that the convolution filter emphasizes the edge, or boundary in the image.

In yet another embodiment, the control data generator detects motion in the input video image to produce a motion vector which, in turn, determines the set of parameter coefficients supplied to the convolution filter. Here, the convolution filter produces a motion blurring effect to exaggerate the detected motion.

In a still further embodiment, the control data generator detects the proximity of a pixel under consideration to a line in the input video image to select a set of parameter coefficients which, depending upon their values, serves to thicken or thin the line in the input video image.

In an additional embodiment, the generated control data represents spatial coordinate correction factors of a lens which, for example, is used to produce the input video image, and parameter coefficients are selected as a function of a lens aberration correction vector to correct the input video image for lens aberration.

BRIEF DESCRIPTION OF THE DRAWINGS

The following detailed description, given by way of example, will best be understood in conjunction with the accompanying drawings in which:

FIGS. 2A and 2B schematically illustrate a pixel array and a set of parameter coefficients which are used by the convolution filter shown in FIG. 1;

FIG. 3 is a block diagram of one embodiment of a parameter generator that may be used with this invention;

FIGS. 8A-8C represent matrix arrays of the input video image, the control data and the processed image respectively, for the embodiment shown in FIG. 7;

FIGS. 11A-11E illustrate different sets of parameter coefficients that are produced by the motion vectors shown in FIG. 10;

FIGS. 13A-13C illustrate matrices which are useful in understanding the operation of the embodiment shown in FIG. 12.

DETAILED DESCRIPTION OF CERTAIN PREFERRED EMBODIMENTS

Figure 1:
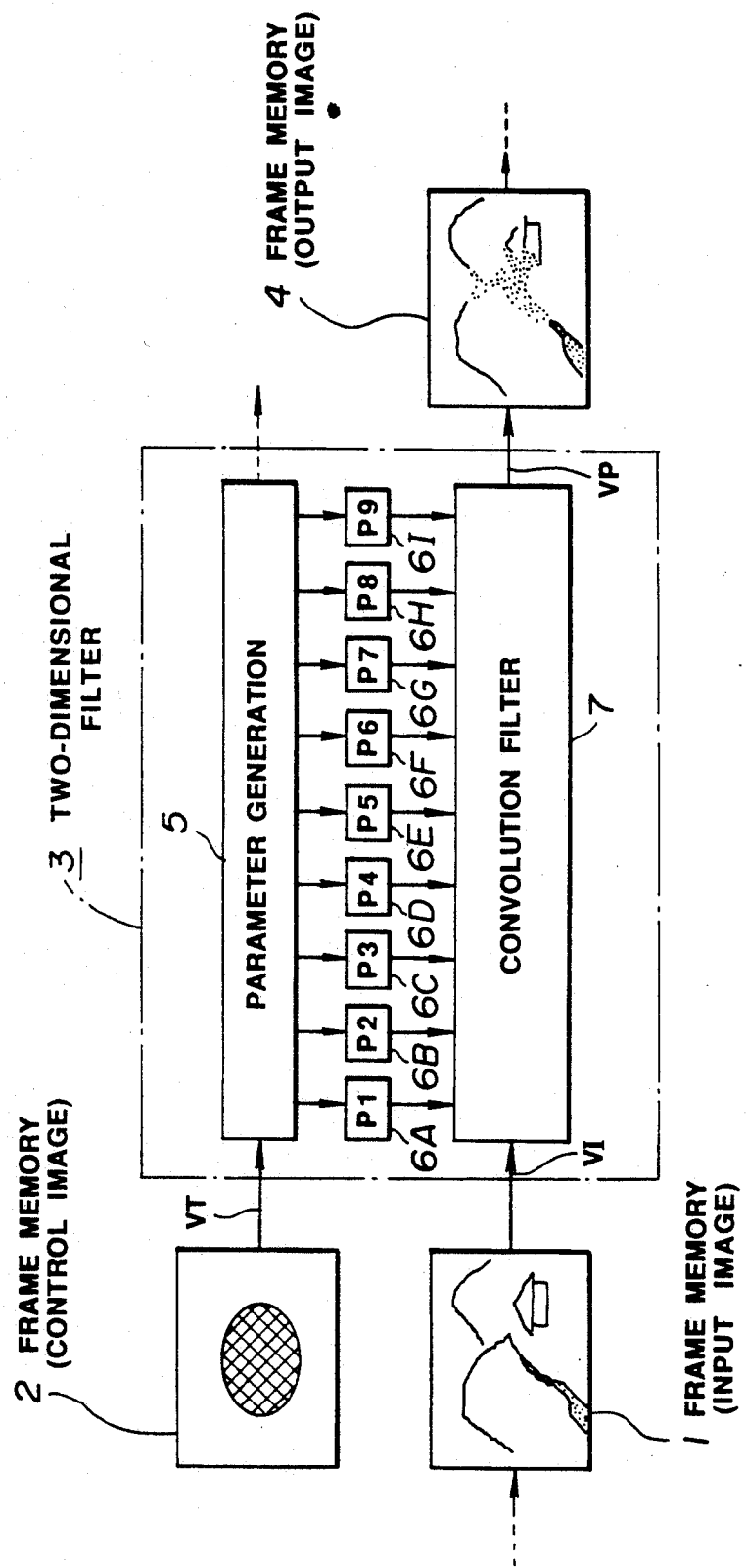
FIG. 1 is a block diagram representing a basic embodiment of the present invention.

Referring now to the drawings, and in particular to FIG. 1, there is illustrated a block diagram of a basic embodiment of video image processing apparatus in accordance with the teachings of the present invention. This apparatus is comprised of a video source 1 for providing an input video image, a control data generator 2 and a two-dimensional filter 3.

The video source preferably is comprised of a frame memory for supplying a line-by-line pixel array of an input video image that may be produced by, for example, a video camera, a video recorder, a video disk player, a computer (such as a personal computer) or the like. The pixels stored in the frame memory are read out therefrom and supplied to two-dimensional filter 3 as successive pixels. Alternatively, the pixels may be supplied to the two-dimensional filter as a block of pixels, such as an $n \times n$ pixel array.

Control data generator 2 is adapted to generate control data which establishes a particular pixel processing operation to be carried out by two-dimensional filter 3. In the basic embodiment illustrated in FIG. 1, the control data generator is comprised of a storage device, such as a frame memory having substantially the same pixel locations as the pixel locations included in the input video image provided by video source 1. A control signal, such as an 8-bit control data word, may be stored at each pixel location included in the control data generator. It is appreciated that each control data word thus may represent any one of 255 levels or values.

Preferably, as each pixel location included in video source 1 is read out to two-dimensional filter 3, the control data word stored at a corresponding pixel location in control data generator 2 likewise is read out and supplied to the two-dimensional filter. As will be described, the particular control data word which is read out thus determines the processing of the pixel supplied from the video source (sometimes referred to herein as the "pixel under consideration"). Thus, the control data generator is used to carry out pixel-by-pixel processing of the input video image.

Two-dimensional filter 3 is comprised of a parameter generator 5, a latch circuit 6 and a convolution filter 7. One embodiment of parameter generator 5 is illustrated in FIG. 3 as a storage device, such as an addressable memory, adapted to supply a set of parameter coefficients determined by control data generator 2. In a preferred embodiment, the parameter generator is adapted to store a plurality of different sets of parameter coefficients, and a particular set supplied to latch circuit 6 is selected, or determined, by the control data. For example, if the parameter generator is comprised of a random access memory (RAM), the control data may be used as an address to read from the RAM the particular set of parameter coefficients stored at the addressed location. In the example described herein, the set of parameter coefficients is comprised of nine coefficients, each of which may be represented as a multi-bit (e.g. an 8-bit) digital number. It will be appreciated that parameter generator 5 may be implemented by other circuitry, whereby a particular set of parameter coefficients is selected by the value of the control data supplied thereto from control data generator 2.

In the illustrated example wherein the set of parameter coefficients generated by parameter generator 5 is comprised of nine coefficients, latch circuit 6 is comprised of nine latch elements, 6A-6I, each adapted to latch or store, a respective one of parameter coefficient P1-P9. These parameter coefficients are adapted to weight the pixels supplied to convolution filter 7 by video source 1.

One implementation of the convolution filter is described in greater detail below in conjunction with FIG. 4; but suffice it to say, the convolution filter is supplied with a pixel under consideration as well as surrounding pixels, each of which is weighted by a respective one of the parameter coefficients stored in latch elements 6A-6I. Each weighted pixel, that is, the weighted pixel under consideration and the weighted surrounding pixels, are summed to produce a processed pixel; and this processed pixel is provided at the output of two-dimensional filter 3.

The processed pixel is used by further apparatus in place of the input pixel under consideration, and in the preferred embodiment an output storage device 4, such as a frame memory, is used to store all of the processed pixels produced by the two-dimensional filter. Hence, output store 4 stores a line-by-line arrangement of processed pixels which represent a processed video image that then may be transmitted, recorded or displayed.

Before describing the operation of the embodiment shown in FIG. 1, it will be noted that the processing of each pixel is a function of the parameter coefficients supplied to convolution filter 7 by parameter generator 5, and these parameter coefficients are determined, or selected, by the control data produced by control data generator 2. Processing thus may be varied simply by changing the sets of parameter coefficients generated by the parameter generator and/or changing the control data generated by control data generator 2. Since it is a relatively simple matter to change either the control data or the parameter coefficient, the particular processing of the input video image may be changed easily. As will be described, selection of the parameter coefficients and the control data facilitates localized processing of the input image.

The manner in which the embodiment shown in FIG. 1 operates now will be described in conjunction with the particular example illustrated therein. Video source 1 provides an input pixel image VI of the illustrated scene; and control data generator 2 supplies control data VT having a pixel array which appears as an ellipse. If the control data generator is assumed to be comprised of a frame memory, the values of the pixels at each pixel location in the frame memory may have a value from, 0 to 255. As an example, the value of each pixel disposed within the ellipse of the control data frame memory may have the value 0 and each pixel in the surrounding area may have the value 255. If these pixel values are to be fixed and not variable, it is appreciated that the control data frame memory may comprise a read only memory (ROM).

Let it be assumed that an area or block of pixels included in the input video image provided by video source 1 is comprised of the pixels shown in FIG. 2A. For convenience, the prefix number of each pixel designates the row in which that pixel is located, and the suffix number represents the column. Thus, pixels in row 1 are represented as G11, G12, ... G15, pixels in row 2 are represented as G21, G22, ... G25, and so on. As mentioned above, when a particular pixel location is read out from video source 1 and supplied to two-dimensional filter 3, the corresponding pixel location is read out of the frame memory which comprises control data generator 2.

Successive image pixels VI are supplied to convolution filter 7 in two-dimensional filter 3 while successive control data words VT are supplied to parameter generator 5 by control data generator 2. Depending upon the particular pixel location then being read out, the control data value may be either approximately 255 or approximately 0.

As will be described in greater detail with respect to FIG. 4, video source 1 supplies a pixel under consideration to a convolution filter 7 and also supplies thereto additional pixels included in the input video image which surround the pixel under consideration. For example, if the pixel under consideration is G33 (FIG. 2A), the video source supplies this pixel as well as surrounding pixels G22, G23, G24, G32, G34, G42, G43, and G44 to the convolution filter. In general terms, an $n \times n$ array of pixels is supplied by the video source, with the pixel under consideration being disposed as the center pixel. In the preferred embodiment described herein, $n=3$.

When the pixel under consideration is supplied by the video source, such as when pixel G33 (together with its surrounding pixels) is supplied to the convolution filter, the control data word stored in the frame memory of control data generator 2 at the pixel location which corresponds to G33 is supplied as the control data word VT to parameter generator 5. As the control data generator generates control data representing the ellipse shown in FIG. 1, the value of the control data word VT generally is either 0 or 255.

Parameter generator 5 responds to the control data word VT supplied thereto to generate a set of parameter coefficients which may be thought of as an $n \times n$ array of coefficients (where $n=3$). FIG. 2B illustrates the set of parameter coefficients which are generated by parameter generator 5 and stored in latch circuit 6.

It will be appreciated that, in the example described herein, coefficient P1 is used to weight pixel G22, coefficient P2 is used to weight pixel G23, coefficient P3 is used to weight pixel G24, and so on. Since pixel G33 is the pixel under consideration and is centered in the $n \times n$ array of pixels supplied by video source 1 to convolution filter 7, it is seen that coefficient P5, which is disposed at the center of the $n \times n$ array of parameter coefficients, is used to weight pixel G33.

Convolution filter 7 produces a processed pixel g33 which may be calculated as follows: $g33 = G22 \cdot P1 + G23 \cdot P2 + G24 \cdot P3 + G32 \cdot P4 + G33 \cdot P5 + \ldots + G44 \cdot P9$ Thus, the processed pixel VP produced by convolution filter 7 is the sum of the $n \times n$ pixels, which include the pixel under consideration and surrounding pixels, each of these pixels being weighted by a respective one of the parameter coefficients P1-P9 generated by parameter generator 5 in response to control data VT.

If the input video image is comprised of color components, such as R, G and B components, the aforedescribed arithmetic, convolution filtering operation may be carried out for each of these components. Similarly, if the input video image is a composite color image, this image may be separated into luminance and chrominance components by conventional means, and then the luminance component Y and chrominance component C may be subjected to the aforedescribed arithmetic operation by convolution filters similar to convolution filter 7.

Now, let it be assumed that the pixel under consideration is the next adjacent pixel included in the array stored in the frame memory of video source 1, namely pixel G34. The control data word stored in the control data frame memory at the location which corresponds to pixel G34 is read out and supplied as control data VT to parameter generator 5, which, in turn, generates the set of parameter coefficients P1–P9. Convolution filter 7 is supplied with pixel G34 and also with surrounding pixels G23, G24, G25, G33, G35, G43, G44 and G45, and each of these pixels is weighted by a respective one of coefficients P1–P9. As before, the convolution filter sums the weighted pixels to produce processed pixel g34 as follows:

$$g34 = G23 \cdot P1 + G24 \cdot P2 + G25 \cdot P3 + \ldots + G45 \cdot P9.$$

In the embodiment described herein, if the control data word read from the control data frame memory represents a high luminance signal, such as if the control data word is disposed at a pixel location outside the ellipse shown in FIG. 1, the set of parameter coefficients produced by parameter generator 5 in response to this control data word is such that parameter P5 (shown in FIG. 2B) has a value 1 and each of the remaining parameters P1–P4 and P6–P9 has the value 0. Alternatively, if the control data word represents a low luminance signal, such as a control data word stored at a pixel location disposed within the ellipse of FIG. 1, the set of parameter coefficients generated by parameter generator 5 is such that each of the parameter coefficients P1–P9 has the value 1/9. Thus, convolution filter 7 operates such that if the supplied pixel under consideration is disposed at a location outside the ellipse represented by control generator 2, that pixel is supplied directly to output store 4 without being combined with any of the surrounding pixels. However, if the pixel under consideration is disposed within the ellipse, convolution filter 7 supplies to output store 4 a processed pixel formed by averaging the pixel under consideration with its surrounding pixels. Thus, predetermined pixels (included in the n×n array) of the input video image are averaged by the convolution filter to produce a processed output pixel VP.

It will be seen from the foregoing that only input video signal image data disposed within the ellipsoid area of the control data stored in the control data frame memory is shaded or vignetted by averaging the n×n pixels to produce a processed pixel. Although the vignetting area is shown in FIG. 1 as an ellipse, it is readily appreciated that this shape may be modified simply by changing the control data values stored at the respective pixel locations in the control data frame memory. That is, the distribution of control data produced by control data generator 2 may be changed easily so as to produce different image processing, as may be desired. Hence, localized image processing may be altered as desired, and may be easily effected without requiring complex and expensive apparatus.

As mentioned above, FIG. 3 illustrates one embodiment of parameter generator 5, which is shown herein as an addressable memory, or RAM. In the illustrated example, each parameter coefficient P1–P9 is stored in a respective RAM 8A–8I, respectively, and each such RAM is addressed by the control data VT produced by control data generator 2. If it is assumed that control data VT is comprised of an 8-bit word, then this 8-bit word is used as an address, and each of RAMs 8A–8I may be provided with $2^8 = 256$ addresses. It will be appreciated that the data stored in each respective addressable location of RAM 8A may differ from the data stored in the same addressable location of RAM 8B, and so on. For instance, and with respect to the example discussed hereinabove wherein the control data word produced by control data generator 2 may represent a high luminance signal having an 8-bit value of 255 or a low luminance signal having an 8-bit value 0, the parameter coefficient 0 may be stored at address 255 of RAMs 8A–8D and 8F–8I, and the parameter coefficient 1 may be stored at address 255 of RAM 8E. Similarly, the parameter coefficient 1/9 may be stored at address 0 for each of RAMS 8A–8I. Hence, if the control data word VT is used as a common address for RAMS 8A–8I, the following sets of parameter coefficients are read out:

| | | | |
|---|---|---|---|
| If VT = 255, | 0 | 0 | 0 |
| | 0 | 1 | 0 |
| | 0 | 0 | 0 |
| If VT = 0, | 1/9 | 1/9 | 1/9 |
| | 1/9 | 1/9 | 1/9 |
| | 1/9 | 1/9 | 1/9 |

FIG. 3 includes an additional addressable RAM 9. If the image processing apparatus includes a plurality of cascaded two-dimensional filters 3, as will be described below in conjunction with, for example, the embodiments of FIGS. 9, 12 and 14, each including a parameter generator 5, the control data word supplied to a next-following two-dimensional filter stage typically is a modified version of the control data word VT produced by control data generator 2. For example, the control data word supplied to the next-following two-dimensional filter stage may be an attenuated version of control data word VT. RAM 9 functions to store modified control data words which are related to control data word VT and which are read out from RAM 9 and supplied to the next-following two-dimensional filter stage as the modified control data word VT1. It will be appreciated that, in the next-following two-dimensional filter stage, control data word VT1 is used to address memories to read out therefrom parameter coefficients in a manner analogous to that by which control data word VT addresses RAMS 8A–8I to read out therefrom parameter coefficients P1–P9. Thus, and as will be described, a processed pixel produced by one two-dimensional filter stage is further processed by a cascaded stage.

As mentioned above, FIG. 4 is a partial block, partial schematic diagram of a preferred embodiment of convolution filter 7. The convolution filter is comprised of pixel delay or storage elements 12A–12I, multipliers 13A–13I and adders 14A–14H. The pixel storage elements are connected as groups of shift registers, each storage element being adapted to store a pixel element for a period of time equal to the rate at which pixels are read out of video source 1 (FIG. 1). In one embodiment, the pixel storage elements may comprise pixel delay devices. For a purpose soon to be described, pixel delay devices 12A–12C are connected as one shift register, pixel delay devices 12D–12F are connected as another shift register and pixel delay devices 12G–12I are connected as a still further shift register. Three shift registers, each formed of three pixel delay devices, are used to provide a 3×3 pixel array to multipliers 13A to 13I.

The shift register comprised of pixel delay devices 12A–12C is connected to receive successive pixels VI supplied from video source 1 directly. The shift register comprised of pixel delay devices 12D-12F is connected to a line memory 10 which, in turn, is supplied with successive pixels read from the video source. Line memory 10 is adapted to impart a delay equal to one horizontal line interval to the pixels supplied from the video source 1.

Likewise, the shift register comprised of pixel delay devices 12G-12I is coupled to a line memory 11 which, in turn, is connected in cascade with line memory 10 and is adapted to impart a delay equal to one horizontal line interval to the pixels that are already delayed by line memory 10. Thus, it will be seen that, by reason of line memories 10 and 11, a particular pixel in one horizontal line which then is being supplied by video source 1 is in time coincidence with the pixel in the same column but in the preceding line, as provided at the output of line memory 10, which is in time coincidence with the pixel in the same column but at two preceding lines, as provided at the output of line memory 11. With respect to FIG. 2, it will be seen that, when pixel G32 is provided by video source 1, pixel G22 is provided at the output of line memory 10 and pixel G12 is provided at the output of line memory 11.

Multiplier 13A is coupled to pixel delay device 12A and latch element 6A and is adapted to multiply, or weight, the pixel produced at the output of delay device 12A with the parameter coefficient P1 stored in latch element 6A. Similarly, multiplier 13B is coupled to pixel delay device 12B and latch element 6B and is adapted to multiply the pixel provided at the output of delay device 12B with parameter coefficient P2. From the illustrated connections of the remaining multipliers, it is seen that each pixel then provided by a respective one of pixel delay devices 12A-12I is multiplied, or weighted, with a respective parameter coefficient P1-P9. The multiplied or weighted pixels are summed, as represented by successive adders 14A-14H. Thus, adder 14A sums the weighted pixels produced by multipliers 13A and 13B, adder 14B sums the added, weighted pixels produced by adder 14A with the weighted pixel produced by multiplier 13C, and so on. Adder 14H thus produces the processed pixel VP.

In operation, it is seen that three successive pixels in one line are provided in time coincidence by pixel delay devices 12A-12C, three pixels in the next line are provided in time coincidence by pixel delay devices 12D-12F and three successive pixels in a third line are provided in time coincidence by pixel delay devices 12G-12I. Each of these time-coincident pixels is included in a 3×3 array, and each is multiplied, or weighted, by a respective parameter coefficient P1-P9. The resultant, weighted pixels are summed by adders 14A-14H to produce the processed pixel VP.

Figure 4:
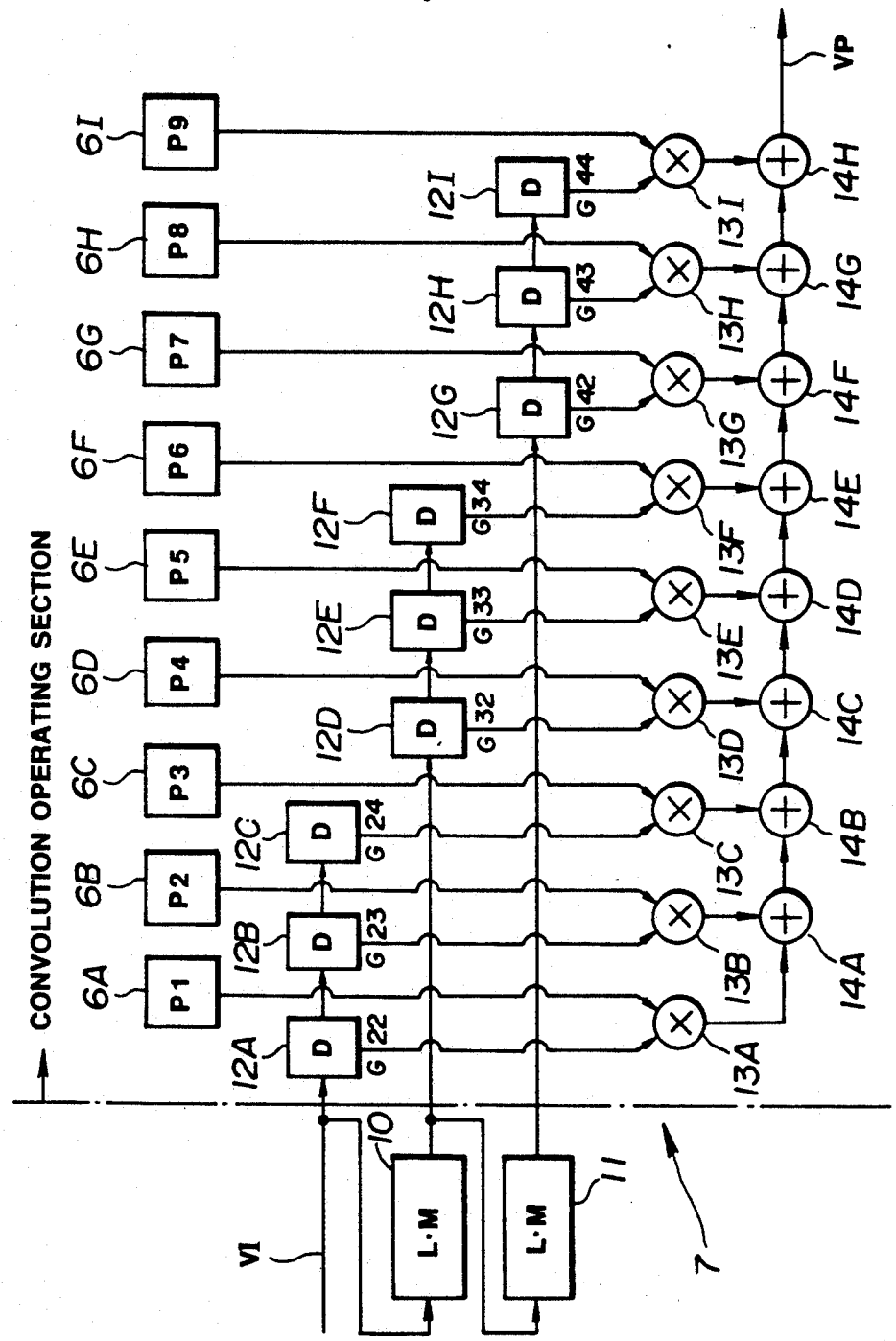
FIG. 4 is a partial block, partial schematic diagram of a convolution filter that may be used with this invention.

It will be appreciated that FIG. 4 is intended simply as a schematic representation, and has been drawn for simplification. Multipliers 13A-13I may be connected to different combinations of pixel delay devices and latch elements to effect arithmetic calculations of weighted pixels to produce the desired processed pixel, as discussed above.

The basic embodiment of video image processing apparatus shown in FIG. 1 may be modified to achieve desired special effects, localized imaged processing, video enhancements, or the like. Illustrative embodiments to effect various applications using the present invention now will be described.

Figure 5:
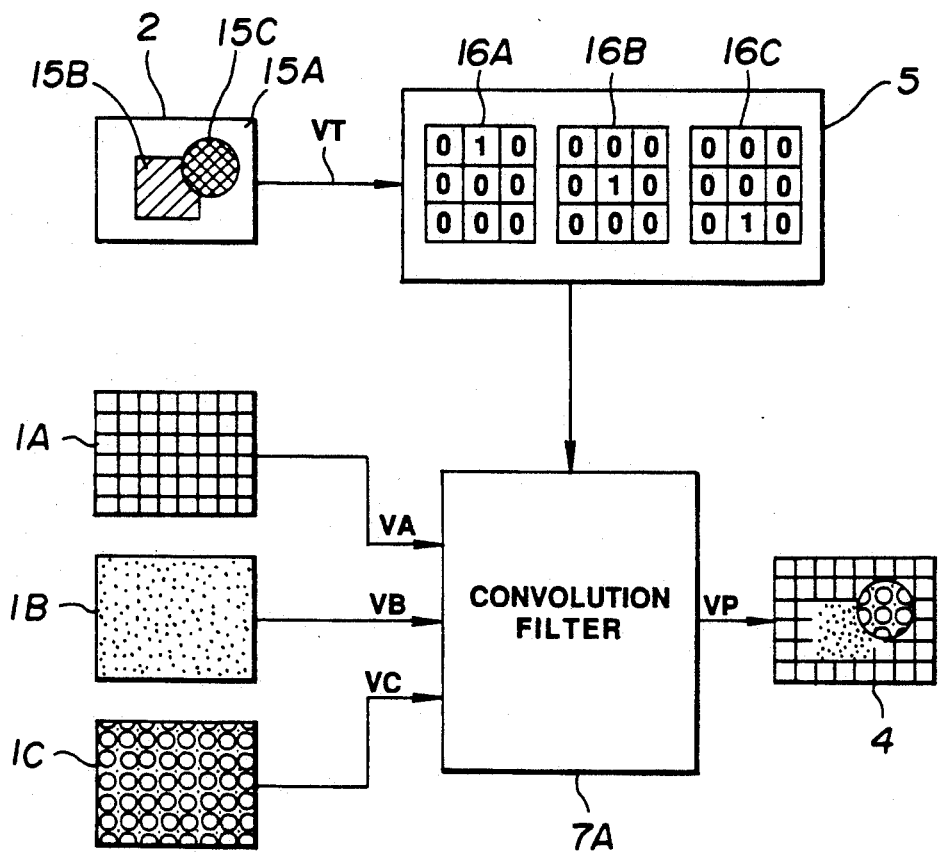
FIG. 5 is a block diagram of an embodiment of the present invention used as an image mixer.

Turning first to FIG. 5, there is illustrated one application of the present invention for use as an image mixer, or switcher. Video source 1 of FIG. 1 is illustrated in FIG. 5 as three separate video sources, 1A, 1B, and 1C, each adapted to provide input video signals VA, VB, and VC representing three different input video images of the type schematically shown in FIG. 5. It will be appreciated that input video signals VA, VB, and VC are comprised of successive pixels similar to successive pixels VI produced by video source 1 of FIG. 1.

Control data generator 2 may be comprised of a storage device, such as a frame memory similar to that discussed above in conjunction with FIG. 1, adapted to store control data words representing different predetermined patterns 15A, 15B, and 15C, arranged in the configuration shown in FIG. 5. As before, if the control data generator includes a frame memory, the control data words stored at each location are read out in synchronism with the successive pixels supplied by video sources 1A-1C. For example, if pixel G11 (see FIG. 2A) is provided by video sources 1A, 1B and 1C, the control data word stored at a location in the control data frame memory corresponding to pixel G11 is supplied as the control data word VT. Likewise, when video sources 1A, 1B and 1C supply pixel G12, the control data word stored at the pixel location of the control data frame memory corresponding to pixel G12 is read out. Thus, a control data word associated with a particular pixel location is supplied to parameter generator 5 when the image pixel at that location is supplied to convolution filter 7 by video sources 1A, 1B and 1C.

Parameter generator 5 is adapted to generate three sets of parameter coefficients, illustrated as sets 16A, 16B and 16C. Depending upon the value of the control data word produced by control data generator 2, a corresponding one of these three sets of parameter coefficients is produced. For example, if the control data word is representative of a pixel location included in pattern 15A, set 16A of parameter coefficients is generated by parameter generator 5. If the control data word represents a pixel location included in pattern 15B, the parameter generator generates set 16B of parameter coefficients. Finally, if the control data word represents a pixel location included in pattern 15C, set 16C of parameter coefficients is generated. It is seen that only one set of parameter coefficients is generated for each pixel location then being accessed. In one example, the control data word stored at pixel locations included in pattern 15A may have a value 0, the control data word stored at pixel locations included in pattern 15B may have a value 128 and the control data word stored at pixel locations included in pattern 15C may have a value 255. Then, set 16A of parameter coefficients is generated in response to a control data word having the value 0, set 16B of parameter coefficients is generated in response to a control data word having the value 128, and set 16C of parameter coefficients is generated in response to a control data word having the value 255.

The convolution filter shown in FIG. 5 differs slightly from convolution filter 7 discussed above in conjunction with FIG. 1 and, for this reason, is identified as convolution filter 7A. Here, when a particular line of successive pixels is provided by video sources 1A, 1B and 1C, the pixels are arranged in successive lines of an array, wherein the first line of the array is formed of successive pixels VA produced by video source 1A, the next line of pixels included in the array is formed of successive pixels VB produced by video source 1B, and a third line of pixels in the array is formed of successive pixels VC produced by video source 1C. For example, let it be assumed that successive pixels of horizontal line 1 are provided by each of the video sources 1A-1C. The resultant array of pixels supplied to convolution filter 7A appears as the following composite:

| A11 | A12 | A13 | A14 | A15 | A16 | A17 | A18 | A19 |
|---|---|---|---|---|---|---|---|---|
| B11 | B12 | B13 | B14 | B15 | B16 | B17 | B18 | B19 |
| C11 | C12 | C13 | C14 | C15 | C16 | C17 | C18 | C19 |

A 3×3 composite array of pixels derived from the foregoing array is weighted in convolution filter 7A by a respective one of set 16A or set 16B or set 16C of parameter coefficients, depending upon whether the pixel under consideration is disposed at a location included in pattern 15A or pattern 15B or 15C produced by control data generator 2. It will be appreciated that convolution filter 7A functions in the same way as convolution filter 7 to produce a processed pixel VP. Successive processed pixels are stored in output store 4, thus producing a processed image which appears as a mixture of the images provided by video sources 1A, 1B and 1C, mixed in accordance with the patterns produced by control data generator 2.

In the example illustrated in FIG. 5, it is appreciated that, by reason of the sets of parameter coefficients generated by parameter generator 5, the image provided by video source 1A is produced directly when pixels disposed at the pixel locations included in pattern 15A are processed; the image provided by video source 1B is produced directly when pixels disposed at the pixel locations disposed within pattern 15B are processed; and the image provided by video source 1C is produced directly when pixels disposed at those pixel locations within pattern 15C are processed. The composite mixed image stored in output store 4 of FIG. 5 illustrates this image mixing or switching operation. It will be recognized that other mixtures or switching arrangements may be implemented simply by changing the control data words generated by control data generator 2 and/or by changing, increasing or decreasing, the sets of parameter coefficients generated by parameter generator 5 in response to a control data word supplied thereto from the control data generator.

Figure 6:
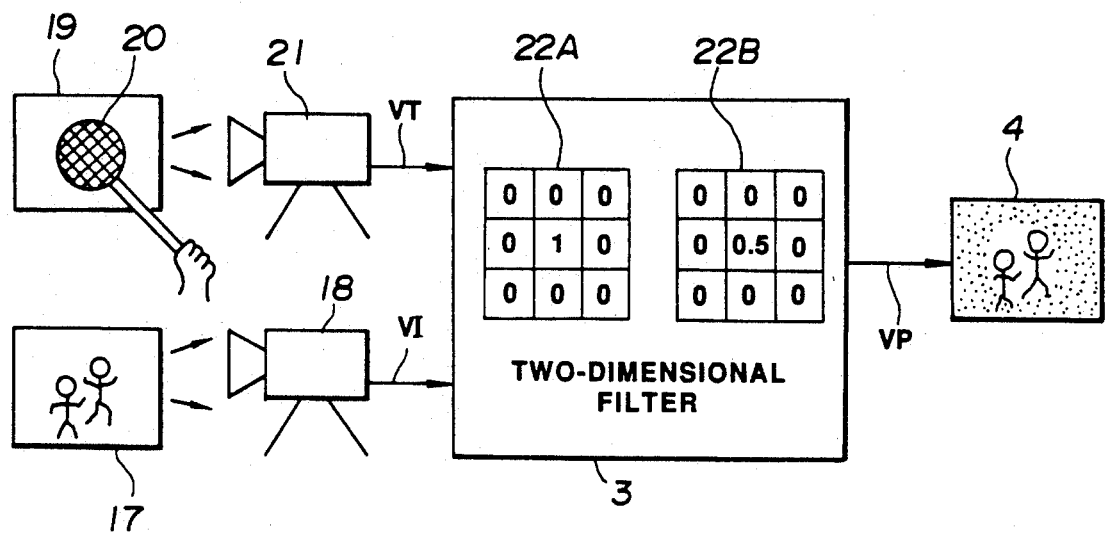
FIG. 6 is a block diagram of a embodiment of this invention used to produce a spotlight effect in a video image.

Another application of the present invention is illustrated in FIG. 6 which represents an embodiment used to produce a spotlight effect in a video image. Here, the video source is comprised of a video camera 18 adapted to pick up, or image, a scene 17; and the control data generator is comprised of another video camera 21 adapted to pick up, or image, a controllable scene formed of, for example, a dark disk 20 superimposed on a light background 19, the relationship or position of the disk to the background being adjustable by the user. Camera 18 (which may be augmented by additional circuitry, not shown) thus is used to produce successive pixels VI of video image 17; and camera 21 is adapted to generate successive control data words VT derived from the scene imaged thereby, namely the superposition of dark disk 20 upon light background 19.

A two-dimensional filter 3, similar to two-dimensional 3 of FIG. 1, is used to convolute the successive pixels VI of video image 17 with parameter coefficients generated in response to the control data words VT derived from the scene imaged by camera 21. In the embodiment described herein, set 22A of parameter coefficients is generated when the control data word VT is derived from the imaging of dark disk 20; and set 22B of parameter coefficients is generated in response to the imaging of light background 19. These sets of parameter coefficients 22A and 22B preferably exhibit the values shown in FIG. 6.

In operation, when a pixel of scene 17 disposed at a pixel location included in dark disk 20 is produced, set 22A of parameter coefficients is generated, resulting in passing the pixel of scene 17 directly to output store 4. However, when a pixel of scene 17 disposed at a pixel location corresponding to light background 19 is produced, set 22B of parameter coefficients serves to attenuate the pixel, for example, by a factor of 0.5, and this attenuated pixel is stored in output store 4. As a result, the pixels stored in output store 4 exhibit attenuated values in those locations corresponding to light background 19, but unattenuated values corresponding to those locations disposed within disk 20. Hence, the scene picked up by camera 18 is provided with a spotlight effect at an area defined by disk 20 and its location relative to light background 19.

Figure 7:
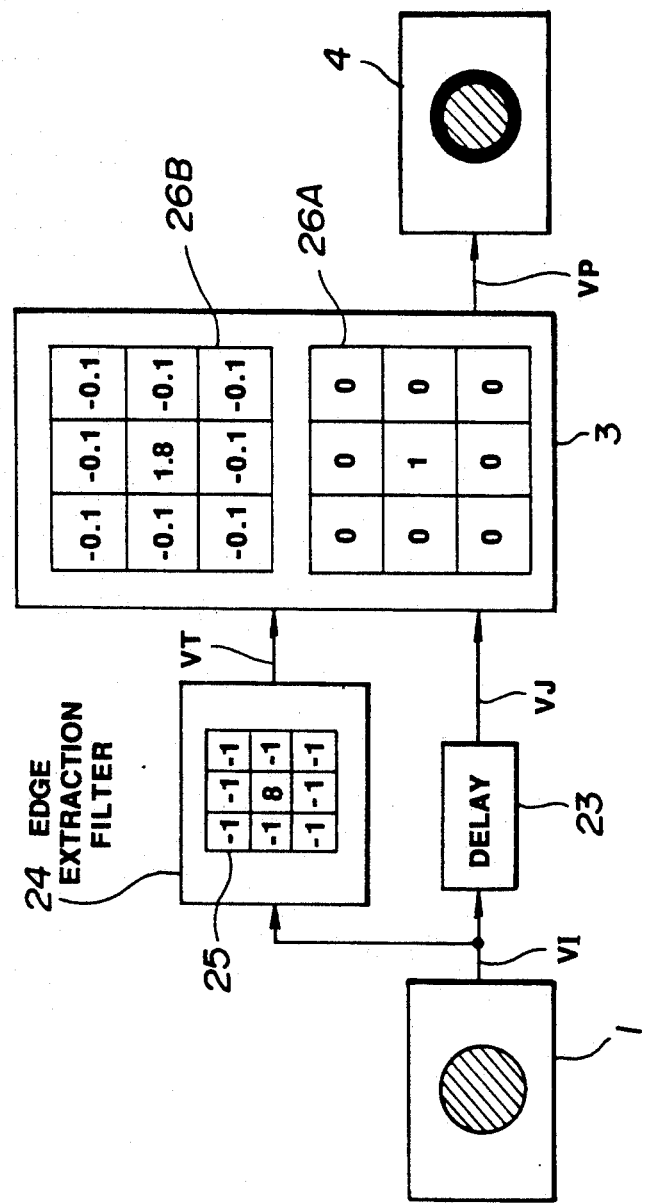
FIG. 7 is a block diagram of an embodiment of this invention used to enhance a contour in an input video image.

Another embodiment of the present invention which is adapted to enhance a contour in an input video image, is illustrated in FIG. 7. Here, the control data generator comprises a edge detector 24 which is coupled to video source 1 and is adapted to detect a boundary, or edge of an object in the image provided by the video source and to generate control data VT indicative thereof. In the preferred embodiment, edge detector 24 is comprised of a convolution filter whose operation is described below. It will be appreciated, however, that other devices can be used to implement the edge detector which produces control data indicative of a detected boundary.

Two-dimensional filter 3 is coupled to edge detector 24 to receive control data VT therefrom. The two-dimensional filter also is coupled to video source 1 by way of a delay circuit 23 which is adapted to "match" the inherent delay of the edge detector. Thus, input video data VI, namely, the successive pixels supplied by the video source, is subjected to a delay such that the delayed video data VJ is supplied to two-dimensional filter 3 in time coincidence with control data VT. It will be seen, then, that a pixel VI is supplied to the two-dimensional filter at the same time as a control data word VT derived from that pixel, which control data word is indicative of whether the pixel is at or near a boundary in the input video image.

In the preferred embodiment illustrated in FIG. 7, the parameter generator included in two-dimensional filter 3 is adapted to generate first or second sets of parameter coefficients, identified as sets 26A and 26B, respectively, depending upon the value of the control data word VT generated by edge detector 24. The convolution filter (not shown) included in the two-dimensional filter convolutes a pixel under consideration supplied by video source 1, as well as surrounding pixels, with respective parameter coefficients included in set 26A or 26B to produce a processed pixel VP. It is seen that output store 4 is coupled to the two-dimensional filter and stores the processed pixels VP produced thereby. As a result, a boundary-enhanced image is stored in the output store and made available for display, transmission, recording or further processing.

The manner in which the embodiment illustrated in FIG. 7 operates to enhance a contour in an input video image now will be described. Let it be assumed that the input video image is a disk superimposed on a background, as shown in FIG. 7, or more instructively, includes the edge of an object, such as a vertical edge. The individual pixels comprising this image are supplied successively to edge detector 24 and, by way of delay circuit 23, to two-dimensional filter 3. In the embodiment presently described, the edge detector comprises a convolution filter including a 3×3 parameter coefficient matrix 25 having the individual parameter coefficients that are illustrated herein. The parameter coefficients which comprise this matrix are used to weight a pixel under consideration plus surrounding pixels; and the weighted pixels are summed. It is appreciated that the pixels which are weighted by parameter coefficient matrix 25 are arranged in a 3×3 array whose center pixel is the pixel under consideration. It is seen from the illustrated parameter coefficient matrix, the center pixel, or pixel under consideration, is weighted by the parameter coefficient 8 and each of the surrounding pixels is weighted by the parameter coefficient −1.

For ease of understanding, let it be assumed that a vertical edge, or boundary, is included in the input video image; and FIG. 8A illustrates a number of pixels which represent this vertical boundary 27. For convenience, pixels to the left of boundary 27 are assigned the value 0 and pixels to the right of boundary 27 are assigned the value 1. It will be appreciated, of course, that other pixel values may be used, and the vertical boundary is represented by a significant change in value from one pixel to the next adjacent pixel. Nevertheless, for simplification and ease of understanding, boundary 27 is illustrated in FIG. 8A as being the demarcation between pixels having the value 0 and pixels having the value 1.

Let a portion of the pixels included in the array illustrated in FIG. 8A be identified as pixels A, B, C, ... K, L, as illustrated. Now, if pixel A is assumed to be the pixel under consideration, it and its surrounding pixels are convoluted in edge detector 24 by parameter coefficient matrix 25, resulting in a processed pixel A' having the value 0. Next, if pixel B in FIG. 8A is assumed to be the pixel under consideration, the convolution filter included in edge detector 24 processes this pixel with parameter coefficient matrix 25 to produce processed pixel B' with the value −3. Next, if pixel C is the pixel under consideration, the processed pixel C' produced by edge detector 24 has the value 3. Finally, if pixel D is assumed to be the pixel under consideration, it is processed by edge detector 24, resulting in processed pixel D' having the value 0. It will be seen that further processing of pixels E, F, G, ... K, L results in processed pixels E', F', G', ... K', L' having the values shown in FIG. 8B.

Thus, edge detector 24 produces control data VT having the values illustrated in FIG. 8B in the vicinity of and at boundary 27. In particular, FIG. 8B illustrates a zone 28 in which the control data value changes from −3 to +3 when boundary 27 is present. Outside zone 28 control data VT has the value 0, indicating that a pixel included in the input video image is remote from boundary 27. However, when control data VT has the value −3, the pixel under consideration is at the boundary and is to one side thereof, such as to the left side; and when the control data has the value 3, the pixel under consideration is at the other side of boundary 27, such as to the right side of the boundary. Thus, the proximity of a pixel under consideration to a boundary is represented by control data VT, as shown in FIG. 8B, and the value of the control data also is indicative of the respective side of the boundary at which the pixel is located.

As mentioned above, two-dimensional filter 3 is adapted to select set 26A or set 26B of parameter coefficients in response to control data VT supplied thereto. In particular, set 26A is selected if the absolute value of control data VT is less than unity ($|VT|<1$); and set 26B is selected if the absolute value of control data VT is equal to a greater than unity ($|VT|>1$). For boundary enhancement in accordance with the present embodiment, sets 26A and 26B of parameter coefficients are as shown in FIG. 7.

It is appreciated that the parameter coefficients of set 26A operate as a so-called throughput matrix in which only the pixel under consideration of the input video image is passed through as is and is thus supplied as the processed pixel VP. Thus, when the absolute value of control data VT is less than 1, meaning that the pixel of the input video image is remote from boundary 27, as illustrated in FIGS. 8A and 8B, the pixel under consideration simply is passed through two-dimensional filter 3 as is. FIG. 8C illustrates that, when the absolute value of the control data is less than 1, that is, when VT=0, the pixel under consideration is passed as is and is not further processed. Thus, pixels A, D, E, H, I and L of FIG. 8A are passed as is and are stored in output store 4 as processed pixels A', D', E', H', I' and L'.

Now, when the absolute value of control data VT is equal to or greater than unity, that is, when VT=−3 or VT=3, as shown in FIG. 8B, the parameter coefficients of set 26B are selected. A comparison of FIGS. 8A and 8B indicates that when the pixel under consideration is pixel B, C, F, G, J, or K, parameter coefficient matrix 26B is selected and is used to convolute the pixel under consideration plus its surrounding pixels. It will be seen that when pixel B is the pixel under consideration, it is processed to produce a processed pixel B″ having the value −0.3. Likewise, pixels F and J are processed by the convolution filter included in two-dimensional filter 3 to produce processed pixels F″ and J″ each having the value −0.3.

However, when pixel C is the pixel under consideration, it and its surrounding pixels are weighted by the parameter coefficients of set 26B, resulting in processed pixel C″ having the value 1.3. Similarly, when pixel G is the pixel under consideration, it and its surrounding pixels are weighted by the parameter coefficients of set 26B to produce processed pixel G″ having the value 1.3. Finally, the convolution filter included in two-dimensional filter 3 processes pixel K to produce the processed pixel K″ having the value 1.3. FIG. 8C illustrates the processing of the pixels shown in FIG. 8A either by parameter coefficient matrix 26A or by parameter coefficient matrix 26B, depending upon the value of control data VT, resulting in the array of processed pixels shown in FIG. 8C. It is seen that those pixels disposed in zone 29 undergo a significant change in value at the boundary defined therebetween. Those pixels which are farther from the boundary have values that are substantially the same as the input pixels shown in FIG. 8A. Thus, by reason of the change in value of the pixels at boundary 27, that is, the change in value of the processed pixels included in zone 29, the boundary or contour included in the input video image is enhanced. Since only the edge or boundary is enhanced, while those pixels remote from the boundary remain substantially intact, the present invention is effective in preventing those image portions which are relatively smooth from appearing as rough areas.

Figure 9:
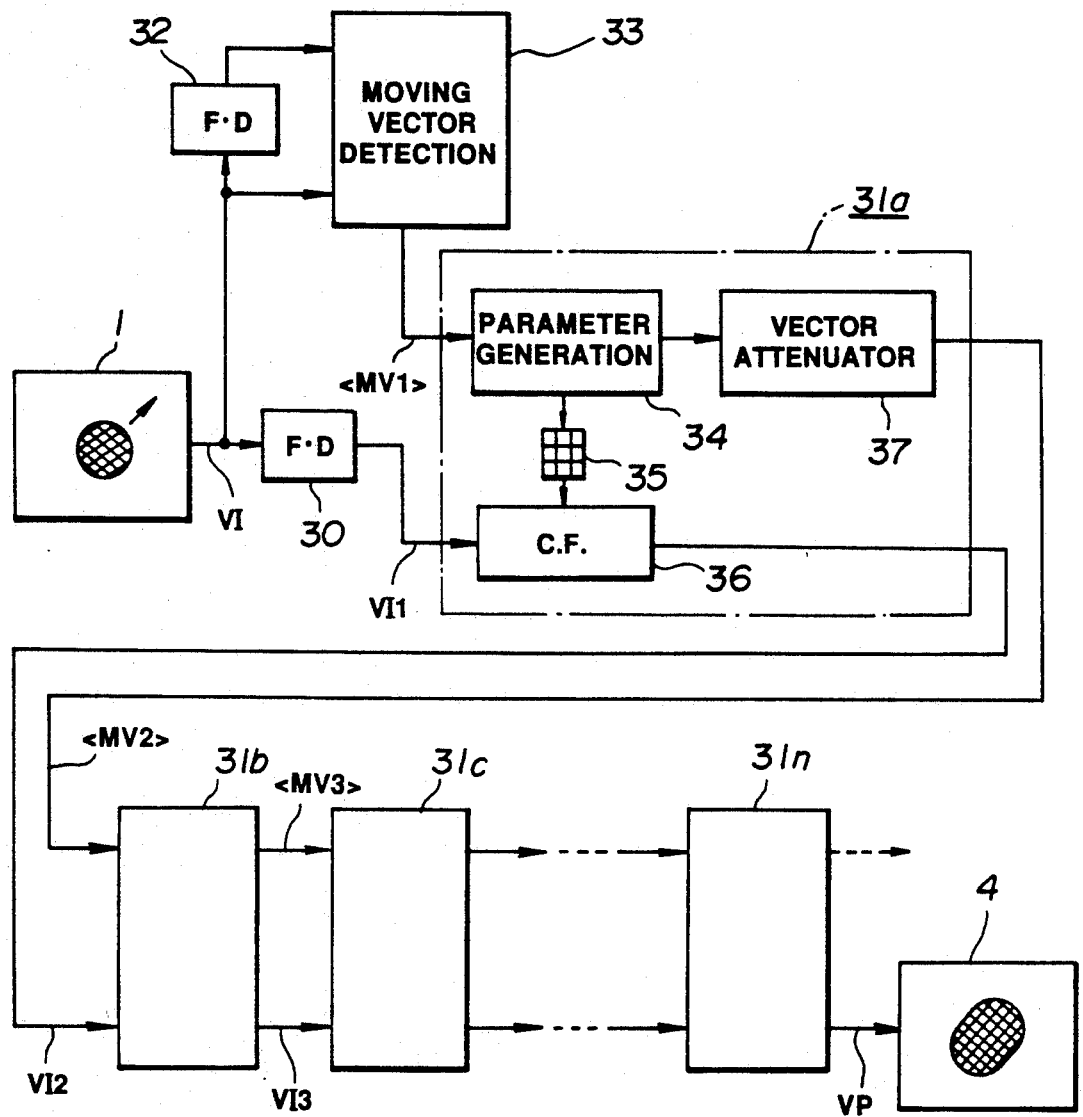
FIG. 9 is a block diagram of an embodiment of the present invention used as a motion blurring filter.

Turning now to FIG. 9, there is illustrated still another embodiment of the present invention adapted for use as a motion blurring filter. In this embodiment, motion in an input video image is emphasized so that, as a special effect, such motion appears blurred. The faster the movement of an object in a scene, the greater will be the blurring effect.

Here, the control data generator is comprised of a motion vector detector 33 and the two-dimensional filter is comprised of cascaded filter stages 31a, 31b, . . . 31m. Motion vector detector 33 is adapted to detect motion in a scene of the input video image provided by video source 1 and, as shown, the motion vector detector is coupled directly to the video source to receive image data VI and is also coupled to the video source by way of a frame delay 32 to receive image data representative of a preceding frame. Motion vector detectors are known to those of ordinary skill in the art and, in one embodiment, a change in pixel value of a particular pixel location from one frame to the next is detected and this change is indicated as a motion vector $<MV>$. This motion vector $<MV>$ thus represents a change in a target pixel from a preceding frame to a current frame. As an alternative, rather than comparing a target pixel from one frame to the next, motion vector detector 33 may be of the type which detects a change in a block of pixels from one frame to the next following frame. The motion vectors produced by the motion vector detector are described further hereinbelow with respect to FIGS. 10A-10E.

Two-dimensional filter 31a, which is typical of the cascade-connected two-dimensional filters shown in FIG. 9, is coupled to motion vector detector 33 to receive the motion vector $<MV>$ produced thereby. The two-dimensional filter also is coupled to video source 1 by way of a frame delay 30 so as to receive video data VI1 representing the preceding frame. Thus, the two-dimensional filter is supplied with the motion vector representing motion from a preceding frame to a present frame and video data, preferably in the form of successive image pixels, representing the image of the preceding frame. As shown, the two-dimensional filter includes a parameter generator 34, a latch circuit 35 and a convolution filter 36. These elements perform the same functions as aforedescribed parameter generator 5, latch circuit 6 and convolution filter 7. It Will be seen, therefore, that the parameter generator operates to provide a set of parameter coefficients as a function of the motion vector $<MV>$ which, for this application, functions as control data.

Two-dimensional filter 31a also includes an attenuator 37 which is coupled to receive the motion vector $<MV>$ produced by motion vector detector 33 and attenuates this motion vector to supply to the next-following two-dimensional filter stage 31b an attenuated motion vector. Attenuator 37 thus may be similar to addressable RAM 9 shown in FIG. 3.

In the illustrated embodiment, m two-dimensional filter stages 31a-31m are provided for the purpose of accentuating the blurring effect produced by the image processing apparatus. It will be seen from the following discussion that the magnitude of this blurring effect is a function of the number of cascaded two-dimensional filter stages that are used.

Figure 10A:
FIGS. 10A-10E illustrate different motion vectors that are detected by the motion detector used in the embodiment of FIG. 9.
Figure 10B:
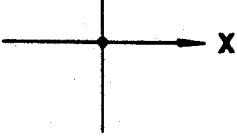
Figure 10C:
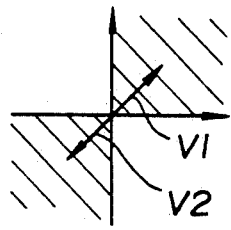
Figure 10D:
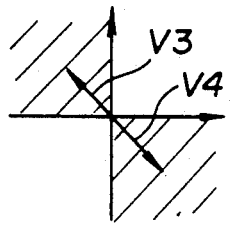
Figure 10E:
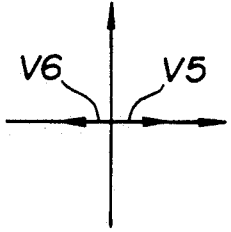

In operation, motion vector detector 33 is adapted to produce a motion vector $<MV1>$ which may be of the type shown in FIGS. 10A-10E. If no motion of a target pixel from one frame to the next is detected, motion vector $<MV1>$ has the value 0 is as indicated in FIG. 10A. However, if the value of a target pixel is changed such that the target pixel in one frame is displaced in the next following frame in the first or third quadrant, motion vector detector 33 produces the motion vector V1 or V2 as shown in FIG. 10B. If this displacement of the target pixel is in the second or fourth quadrant, the motion vector detector produces motion vector V3 or V4 as shown in FIG. 10C. Similarly, if the target pixel appears to be displaced solely in the horizontal direction, as by one pixel to the right or one pixel to the left; the motion vector detector produces motion vector V5 or V6 as shown in FIG. 10D. If this displacement of the target pixel is substantially only in the vertical direction, motion vector detector 33 produces the motion vector V7 or V8 as shown in FIG. 10E.

Parameter generator 34 responds to a motion vector 0 as shown in FIG. 10A or a motion vector V1-V8, as shown in FIGS. 10B-10E, to generate a corresponding set of parameter coefficients. For example, if the parameter generator includes one or more RAMs, such as shown in FIG. 3, the sets of parameter coefficients shown in FIGS. 11A-11E are read out of these RAMs if the motion vector produced by motion vector detector 33 is a shown in FIGS. 10A-10E, respectively. Thus, the set of parameter coefficients shown in FIG. 11A is provided when the motion vector is 0; the set of parameter coefficients shown in FIG. 11B is provided when the motion vector is V1 or V2; the set of parameter coefficients shown in FIG. 11C is provided when the motion vector is V3 or V4; the set of parameter coefficients shown in FIG. 11D is provided when the motion vector is V5 or V6; and the set of parameter coefficients shown in FIG. 11E is provided when the motion vector is V7 or V8.

Convolution filter 36 convolutes the pixel under consideration VI1 plus its surrounding pixels, all supplied thereto by frame delay 30, with the particular set of parameter coefficients generated by parameter generator 34. It is appreciated that, if no motion is detected, as represented by the motion vector shown in FIG. 10A, the pixel under consideration simply is passed through the convolution filter substantially unaltered. However, if motion in the first or third quadrants is detected, as shown in FIG. 10B, convolution filter 36 produces a processed pixel by summing the weighted pixels in a diagonal line parallel to the direction of the motion vector. Likewise, if motion is detected in the second or fourth quadrants, as represented by the motion vector shown in FIG. 10C, convolution filter 36 sums weighted pixels which are aligned in a direction parallel to this motion.

From FIGS. 10D and 11D, if horizontal motion is detected, the convolution filter produces a processed pixel by summing the weighted pixels aligned horizontally. Finally, from FIGS. 10E and 11E, if vertical motion is detected, the convolution filter sums the weighted pixels which are vertically aligned. From FIGS. 11B-11E, it is appreciated that the weighting coefficients have the value $\frac{1}{4}$.

While the set of parameter coefficients is illustrated as a set of nine coefficients for weighting a 3×3 matrix array, it will be appreciated that a greater number of parameter coefficients may be used to weight an array of n×n pixels, as has been described above.

It is seen that convolution filter 36 produces a processed pixel VI2 by averaging those pixels VI1 supplied thereto by frame delay 30 which are aligned in a direction parallel to the detected motion vector produced by motion vector detector 33. This processed pixel VI2 is supplied to the cascaded two-dimensional filter stage 31b as the pixel under consideration, and processed pixels produced by convolution filter 36 in the preceding filter stage 31a that surround the pixel under consideration also are supplied to stage 31b for convoluting with parameter coefficients generated by the parameter generator included in this stage 31b. Furthermore, attenuator 37 operates to attenuate the magnitude of motion vector <MV1>, resulting in an attenuated motion vector <MV2> that is supplied to the parameter generator included in the stage 31b. Parameter coefficients are generated by the parameter generator included in stage 31b in response to the attenuated motion vector <MV2> in a manner similar to that in which parameter generator 34 generates the parameter coefficients shown in FIGS. 11A–11E. The convolution filter included in stage 31b convolutes the processed pixels supplied thereto as image data VI2 with the particular set of parameter coefficients generated by the parameter generator in response to the attenuated motion vector <MV2>.

Attenuator 37 operates to attenuate the motion vector shown in FIGS. 10A–10E by an amount equal to a unit length directed toward the origin. If this unit length represents the length of a pixel and is indicated as 1, then a unit length in the X-direction may be represented as <1,0>, a unit length in the Y-direction may be represented as <0,1> and a unit length in the diagonal direction (such as in the first or third quadrant) may be indicated as <1,1,>. Accordingly, if the motion vector <MV1> is any one of vectors V1-V8 shown in FIGS. 10B–10E, then attenuator 37 produces the attenuated motion vector <MV2> as follows:

| <MV1> | <MV2> |
|---|---|
| V1 | V1-<1,1> |
| V2 | V2-<−1,−1> |
| V3 | V3-<−1,1> |
| V4 | V4-<1,−1> |
| V5 | V5-<1,0> |
| V6 | V6-<−1,0> |
| V7 | V7-<0,1> |
| V8 | V8-<0,−1> |

Two-dimensional filter stage 31b thus processes the image data VI2 produced by convolution filter 36 of two-dimensional filter stage 31a with parameter coefficients determined by attenuated motion vector <MV2> to produce processed image data VI3. Stage 31b also includes an attenuator similar to attenuator 37 for the purpose of attenuating the attenuated motion vector <MV2> to produce a further attenuated motion vector <MV3>. Succeeding two-dimensional filter stages 31c . . . 31m operate in a manner similar to that described above in conjunction with two-dimensional filter stage 31a to convolute video image data VI3, . . . VIm with parameter coefficients determined by attenuated motion vectors <MV3> . . . <MVm>. As shown in FIG. 9, the processed pixels VP produced by the last of the cascaded stages 31m are supplied to and stored in output storage device 4.

By reason of the processing of the pixels by the cascaded two-dimensional filter stages as aforedescribed, if an object in an input scene moves, such as in the direction represented by the arrow shown at video source 1, the image represented by the processed pixels stored in output storage device 4 is blurred in that direction, as schematically depicted in FIG. 9. Thus, the processed image is subjected to a motion blurring effect. The magnitude of this effect is proportional to the number of stages that are connected in cascade and also to the magnitude of motion vector <MV1>. Thus, an increase or decrease in this motion blurring effect may be achieved by adding or decreasing the number of cascaded two-dimensional filter stages and also by changing the magnitude of the motion vector produced by motion vector detector 33 in response to sensed motion of a target pixel. That is, for a given magnitude of motion, the magnitude of the motion vector may be greater or smaller, thus increasing or decreasing the motion blurring effect for that detected motion.

As a modification of the embodiment shown in FIG. 9, a substantial motion blurring effect can be achieved by using only one two-dimensional filter stage 31a, wherein the parameter coefficient matrix generated by parameter generator 34 is a much larger matrix, such as a 10 x 10 matrix operable on a 10×10 array of pixels which may comprise the video image VI1 supplied to convolution filter 36 by frame delay 30. However, this requires a substantially larger memory to accommodate the different 10×10 parameter coefficient matrices and a more complicated convolution filter to convolute a 10×10 pixel array with those parameter coefficients. Thus, for simplicity and reduced costs, it is preferred to use a plurality of cascaded two-dimensional filter stages, wherein each stage is of relatively simple construction and low cost.

Figure 12:
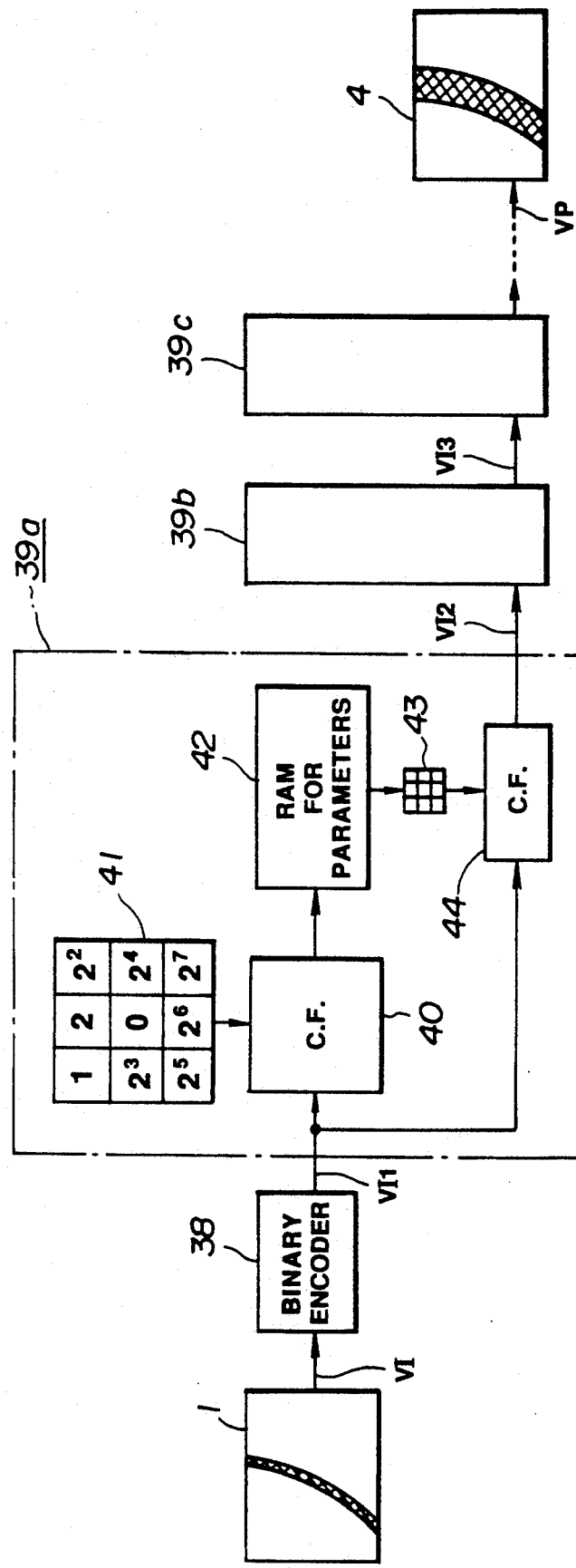
FIG. 12 is a block diagram of yet another embodiment of the present invention adapted to operate as a stroke thickness changing filter (e.g. a stroke thickening or stroke thinning filter)

Turning now to FIG. 12, there is illustrated a block diagram of yet another embodiment of the present invention adapted to operate as a stoke thickness changing filter, whereby a line, or stroke in an input image is thickened or thinned. In this embodiment, the control data generator comprises a stroke detector 40, 41 which is adapted to detect a line stroke in a scene of the input video image provided by video source 1. The control generator functions to generate control data which is used to change the effective thickness of that stroke. The stoke detector is comprised of a convolution filter 40 and a coefficient matrix generator 41 adapted to supply to the convolution filter a set of fixed, predetermined coefficients as shown in FIG. 12. Coefficient filter 40 is coupled to video source 1 by way of a binary quantizer 38 which is adapted to convert the luminous level of each pixel of the input image either to a high level or to a low level. This quantizer thus functions to represent a pixel included in a stroke, or line, as a "1" and a pixel included in a background or adjacent area as a "0".

The output of the stroke detector is derived from convolution filter 40 and is coupled to the two-dimensional filter formed of parameter generator 42, latch circuit 43 and convolution filter 44. It is seen that this two-dimensional filter is quite similar to two-dimensional filter 3 shown in FIG. 1; and parameter generator 42 is implemented by a RAM, such as shown in FIG. 3.

The stroke detector and two-dimensional filter comprise a filter stage 39a; and as shown in the preferred embodiment of FIG. 12, a plurality of filter stages 39b, 39c, . . . are connected in cascade. The output of the last filter stage provides a processed pixel VP which is coupled to and stored in output store 4. The stored processed pixels comprise a processed video image in which the thickness of the original stoke, or line is changed.

The manner in which the embodiment shown in FIG. 12 operates now will be described in conjunction with the matrixes shown in FIGS. 13A-13C. Let it be assumed that a section of the pixels which comprise the input image provided by video source 1 are such that, after binary quantization by quantizer 38, the quantized pixels appear as shown in FIG. 13A. It will be recognized that the quantized pixels which are included in the line are represented by shaded pixel elements, and the pixels included in the background area are represented by unshaded pixel elements. It is further assumed, as mentioned above, that a quantized pixel element included in the line is represented as a "1" and a quantized pixel element adjacent the line is represented as a "0". These quantized pixel elements VI1 are supplied to convolution filter 40 by quantizer 38. It is appreciated that these quantized pixels VI1 also are supplied to convolution filter 44.

Now, if the quantized pixel under consideration is pixel PI of FIG. 13A, convolution filter 40 convolutes this pixel, together with its surrounding quantized pixels, with the coefficients included in coefficient matrix 41. Accordingly, convolution filter 40 processes pixel PI by weighting this pixel and its surrounding pixels with corresponding ones of the coefficients shown in matrix 41 and summing the weighted pixels, thereby producing a processed pixel having the value of $1 + 2^3 + 2^5$. It is appreciated that this value may be expressed as an 8-bit digital number as follows: 00101001. This 8-bit number is supplied to parameter generator 42 as a control data word and is used by the parameter generator to select a set of parameter coefficients which is used by convolution filter 44 to convolute the pixel under consideration PI and its surrounding pixels.

Similarly, if the quantized pixel under consideration supplied by quantizer 38 is pixel PI2, shown in FIG. 13A, convolution filter 40 convolutes this pixel and its surrounding pixels with matrix 41 to produce a control data word having the value $2 + 2^6$. This value may be represented as the 8-bit control data word 01000010. Parameter generator 42 responds to this control data word to select a set of parameter coefficients for use by convolution filter 44 to convolute the pixel under consideration PI2 and its surrounding pixels.

Thus, it is seen that the control data generator generates a control data word whose value is indicative of the proximity of the quantized pixel under consideration to a line or stroke included in the input image. The value of this control data word in the embodiment described herein increases as the pixel under consideration approaches the line; and the value of the control data word also is determined by the thickness of the line. In particular, if the line thickness is equal to or greater than 3 pixel widths, the value of the control data word is a maximum when the pixel under consideration is well within the line.

When the embodiment of FIG. 12 is used to increase the thickness of a line included in the input image, a quantized pixel which is detected as being adjacent the line, such as quantized pixel PI, is processed to be a "1" so as to appear as being a part of the detected line. Thus, if the value of the control data word exceeds a predetermined threshold, thereby indicating that the pixel under consideration is adjacent the line, parameter generator 42 responds to the control data word to produce a set of parameter coefficients of the type shown in FIG. 13B. This set of parameter coefficients is supplied to convolution filter 44 for convoluting the quantized pixel under consideration PI as well as its surrounding pixels. It is appreciated that, as a result of this convolution processing, the value of the quantized pixel PI is changed from "0" to "1", as shown in FIG. 13C. Likewise, if the quantized pixel under consideration is pixel PI3 (FIG. 13A), the stroke detector supplies a control data word to parameter generator 42 to select the set of parameter coefficients shown in FIG. 13B. Hence, when quantized pixel PI3 is convoluted with this set of parameter coefficients, the quantized value of this pixel is changed from "0" to "1".

Therefore, it will be seen that the thickness of the line included in the input image provided by video source 1 is enlarged by 1 pixel by reason of the operation of filter stage 39a. The processed pixels representing this thickened line are themselves processed in next-following stage 39b which operates in substantially the same way as discussed hereinabove in conjunction with stage 39a. As a result, the thickened line is enlarged by yet another pixel. Thus, as additional cascaded filter stages are used to process the pixels included in the video image, each stage serves to thicken the line therein by one pixel. Output store 4 stores the resultant processed pixels and thus represents an output image having a stroke whose thickness has been increased.

One of ordinary skill in the art will appreciate that, if the set of parameter coefficients selected by parameter generator 42 in response to the control data word supplied thereto by convolution filter 40 is modified, convolution filter 44 may be operated to process the quantized pixels PI1 in a manner so as to reduce the thickness of the stroke included in the input image. For example, the parameter coefficients generated by the parameter generator may be such that the first pixels included in a line, or stroke, are processed so as to be converted from "1" to "0".

Figure 14:
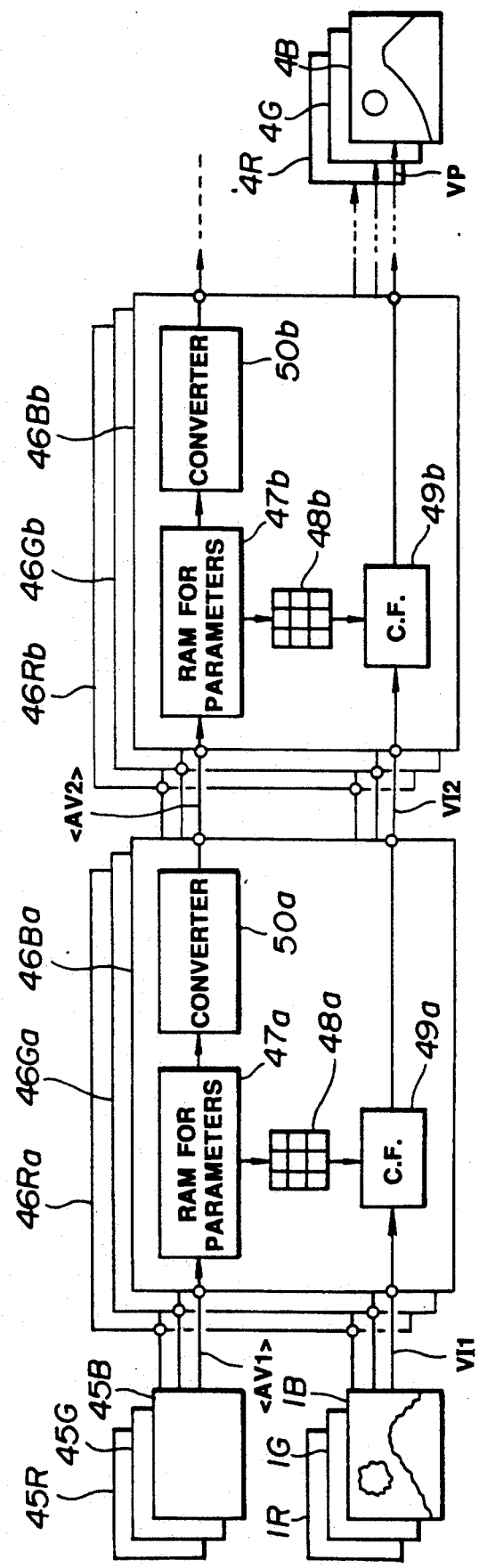
FIG. 14 is a block diagram of a still further embodiment of the present invention used as a lens aberration corrector.

Referring now to FIG. 14, there is illustrated a block diagram of a still further embodiment of the present invention adapted for use as a lens aberration corrector. In this embodiment, respective video sources 1R, 1G and 1B are provided to supply successive pixels of a red input video image, a green input video image and a blue input video image, respectively. For example, these video sources may comprise frame memories wherein one frame of a red image, one frame of a green image and one frame of a blue image are stored.

The control data generator is comprised of read only memories (ROMs) 45R, 45G and 45B, each adapted to supply a control data word, such as an 8-bit word, representing a red aberration correction vector, a green aberration correction vector and a blue aberration correction vector, respectively. As in the basic embodiment of FIG. 1, when a pixel location included in, for example, video source 1B is read out as pixel VI1, a control data word <AV1> representing the aberration correction vector at that same pixel location is read out from, for example, ROM 45B. Thus, for each pixel provided by video source 1B, an aberration correction vector for that pixel location is read out from ROM 45B. Similarly, for each pixel provided by video source 1G, an aberration correction vector for that pixel location is read out from the ROM 45G. A similar relationship exists between video source 1R and ROM 45R. It will be appreciated that the aberration correction vectors stored in ROMs 45R, 45G and 45B represent spatial coordinate correction factors of a lens which focuses a composite R, G, B image.

A respective two-dimensional filter is provided for the pixels included in the red, green and blue images. In addition, and as shown in FIG. 14, a plurality of two-dimensional filters for each color are cascaded. Thus, two-dimensional filter 46Ra is used to convolute pixels provided by red video source 1R with parameter coefficients selected by the red aberration correction vector read from ROM 45R, and this two-dimensional filter is connected in cascade with two-dimensional filter 46Rb. Similarly, two-dimensional filter 46Ga is used to convolute pixels provided by green video source 1G with parameter coefficients selected by the green aberration correction vector read from ROM 45G, and this two-dimensional filter is connected in cascade with two-dimensional filter 46Gb. Finally, two-dimensional filter 46Ba is connected to convolute pixels provided by blue video source 1B with parameter coefficients selected by the aberration correction vector read from ROM 45B, and this two-dimensional filter is connected in cascade with two-dimensional filter 46Bb.

It will be recognized that two-dimensional filters 46Ra, 46Ga and 46Ba operate independently of each other. For convenience and simplification, only two-dimensional filter 46Ba is discussed further herein. FIG. 14 illustrates this two-dimensional filter as comprising a RAM 47a which stores sets of parameter coefficients selected by the aberration correction vector <AV1> read from ROM 45B. The selected set of parameter coefficients is stored in a latch circuit 48a and supplied to a convolution filter 49a which uses this set of parameter coefficients to convolute the pixel under consideration VI1 as well as its surrounding pixels, supplied by blue video source 1B. Convolution filter 49a processes the pixel under consideration and supplies the processed pixel VI2 to convolution filter 49b included in the cascaded two-dimensional filter 46Bb.

Aberration correction vector <AV1> is supplied not only to RAM 47a of two-dimensional filter 46Ba, but also to an attenuator 50a. This attenuator may be similar to aforedescribed attenuator 37 (FIG. 9) and provides an attenuated version of the aberration correction vector <AV1>. Hence, attenuator 50a may be similar to RAM 9 shown in FIG. 3. The attenuated aberration correction vector <AV2> produced by attenuator 50a is coupled to cascaded two-dimensional filter 46Bb whereat it is used by RAM 47b to select a set of parameter coefficients for convoluting the pixels VI2 that had been processed by two-dimensional filter 46Ba. Two-dimensional filter 46Bb also includes an attenuator 50b, similar to attenuator 50a, to provide further attenuation to the aberration correction vector. Additional cascaded stages may be connected as represented by the broken lines of FIG. 14.

The processed pixels VP produced by the final stage of red, green and blue two-dimensional filters are stored in red, green and blue output stores 4R, 4G and 4B, respectively. Thus, each of these output stores provides a pixel array representing a processed video image of a respective color component.

It will be appreciated that the parameter coefficients selected by RAM 47a (or 47b) is determined by the magnitude of the aberration correction vector supplied thereto. As this aberration correction vector changes with different pixel locations, the processing of the pixels provided by the video source likewise changes. Thus, lens aberrations may change not uniformly, but the video image derived from a particular lens nevertheless is corrected. By providing cascaded two-dimensional filters for correcting lens aberration, it will be recognized that even a considerable amount of aberration can be corrected easily and effectively without requiring complex and expensive apparatus.

While the present invention has been particularly shown and described with reference to preferred embodiments, it will be appreciated by those of ordinary skill in the art that various changes and modifications may be made without departing from the spirit and scope of the invention. It is intended that the appended claims be interpreted as including the embodiments specifically herein, modifications which have been discussed and all equivalents thereto.

What is claimed is:

1. Video image processing apparatus for processing pixels included in a video image, comprising
   control data means for generating control data to establish one of a plurality of different types of pixel processing operations for a pixel under consideration;
   parameter generating means responsive to said control data for generating a set of parameter coefficients whose values are determined by said control data, said parameter generating means including addressable memory means for storing plural sets of parameter coefficients, each set corresponding to a respective type of pixel processing operation, said addressable memory means being addressed by said control data to read out therefrom a particular set of parameter coefficients determined by said control data;
   input video data means for providing successive pixels of an input video image, including said pixel under consideration and surrounding pixels; and
   convolution filter means coupled to receive said set of parameter coefficients read out from said addressable memory means and predetermined pixels of said input video image, including said pixel under consideration and said surrounding pixels, for convoluting the received pixels with said parameter coefficients and thereby produce a processed pixel.

2. The apparatus of claim 1 wherein said convolution filter means comprises weighting means for weighting respective ones of said predetermined pixels with respective ones of said parameter coefficients, and summing means for summing the weighted pixels to produce said processed pixel.

3. The apparatus of claim 2 wherein said predetermined pixels comprise said pixel under consideration and a two-dimensional array of pixels centered on said pixel under consideration.

4. The apparatus of claim 3 wherein said two-dimensional array comprises an n×n array of pixels.

5. The apparatus of claim 4 wherein n=3.

6. The apparatus of claim 3 wherein said weighting means comprises plural multiplying means, each supplied with a respective parameter coefficient and a respective pixel for multiplying the supplied parameter coefficient and pixel to produce a weighted pixel.

7. The apparatus of claim 3 wherein said control data means comprises storage means for storing control data values associated with the pixels of said input video image.

8. The apparatus of claim 7 wherein said storage means comprises a frame memory for storing a frame of control data values, each control data value corresponding to a pixel location in said input video image.

9. The apparatus of claim 7 wherein said storage means comprises a read only memory.

10. The apparatus of claim 1 wherein said addressable memory means comprises a random access memory for storing sets of parameter coefficients that are changeable by a user.

11. The apparatus of claim 1 further comprising output storage means for storing an array of processed pixels whereby a processed video image is produced therefrom.

12. The apparatus of claim 11 wherein said output storage means comprises a frame memory for storing a video frame of processed pixels.

13. The apparatus of claim 1 wherein said control data means comprises a stored array of predetermined control values, with individual control values stored at locations corresponding to pixel locations of an input video image, and means for retrieving the control value at the location which corresponds to the pixel location of said pixel under consideration.

14. The apparatus of claim 13 wherein said stored array of predetermined control values represent plural predetermined patterns.

15. The apparatus of claim 14 wherein said input video data means comprises plural input means for supplying plural input image signals each comprised of plural lines of pixels, and means for coupling to said convolution filter means a respective line of pixels in said input images such that the predetermined pixels received by said convolution filter means are derived from different images, whereby an image comprised of processed pixels is a mixture of said plurality input images arranged in accordance with said predetermined patterns.

16. The apparatus of claim 15 wherein said means for coupling a respective line of pixels to said convolution filter means is operative to couple to said convolution filter means a given line of pixels in each input image followed by a succeeding line of pixels in each said input image.

17. The apparatus of claim 16 wherein said parameter generating means is operative to read out a different respective set of parameter coefficients for each pattern when a control value stored at a location included in that pattern is retrieved.

18. The apparatus of claim 13 wherein said stored array of predetermined control values comprise lens aberration correction vectors representing spatial coordinate correction factors of a lens; and wherein said input video data means includes a video camera having said lens.

19. The apparatus of claim 18 wherein said input video data means further includes means for providing successive pixels of plural color component images; and wherein said stored array of lens aberration correction vectors comprises a respective array of lens aberration correction vectors for each color component image.

20. The apparatus of claim 19 wherein said convolution filter means comprises a respective convolution filter for each color component image for multiplying a pixel under consideration of a respective color component image, together with predetermined pixels which surround the pixel under consideration, with parameter coefficients determined by the lens aberration correction vector retrieved from the location corresponding to said pixel under consideration of said respective color component image.

21. The apparatus of claim 19 wherein said convolution filter means comprises plural cascade connected convolution filters, each filter including a respective filter section for a respective color component.

22. The apparatus of claim 1 wherein said control data means comprises edge detecting means for detecting a boundary in said input video image and generating control data indicative thereof.

23. The apparatus of claim 22 further comprising means for supplying said successive pixels of an input video image to said edge detecting means; and said edge detecting means comprises means for generating boundary control data indicative of a respective side of a boundary in said input video image and means for generating other control data indicative of nonboundary portions in said input video image.

24. The apparatus of claim 23 wherein said parameter generating means comprises means responsive to boundary control data indicative of a predetermined one side of a boundary for reading out one set of parameter coefficients, and means responsive to said other control data for reading out a different set of parameter coefficients.

25. The apparatus of claim 22 further comprising means for supplying said successive pixels of an input video image to said edge detecting means; and said edge detecting means comprises an edge extraction convolution filter including a predetermined n×n matrix of convoluting values, means for multiplying respective pixels in an n×n array of pixels of said input video image by respective ones of said convoluting values, said n×n array of pixels being centered on said pixel under consideration, and means for summing the multiplied n×n pixels to produce said control data.

26. The apparatus of claim 25 wherein the addressable memory means of said parameter generating means stores first and second sets of parameter coefficients, and said parameter generating means further includes means for selecting said first set when said produced control data exceeds a threshold value and for selecting said second set when said produced control data is less then said threshold value.

27. The apparatus of claim 1 wherein said control data means comprises motion detecting means for detecting motion in a scene of said input video image and generating control data indicative thereof.

28. The apparatus of claim 27 further comprising means for supplying said successive pixels of an input video image to said motion detecting means; and said motion detecting means comprises frame delay means for delaying the supplied pixels by a video frame interval, and means for producing a motion vector as a function of a difference between the supplied pixels and the delayed pixels.

29. The apparatus of claim 28 wherein said convolution filter means comprises plural cascade-connected convolution filter stages.

30. The apparatus of claim 29 wherein each convolution filter stage includes a parameter generator for generating a respective set of parameter coefficients in response to a motion vector applied thereto, plural multipliers for multiplying the generated set of parameter coefficients with an array of pixels comprised of said pixel under consideration and predetermined surrounding pixels, and summing means for summing respective, multiplied pixels to produce a processed pixel as an output of said convolution filter stage.

31. The apparatus of claim 30 wherein each convolution filter stage further includes attenuating means for supplying to the parameter generator in the next-following cascade-connected stage an attenuated motion vector.

32. The apparatus of claim 1 wherein said control data means comprises stroke detecting means for detecting a line stroke in a scene of said input video image and for generating control data to change the effective thickness of said stroke.

33. The apparatus of claim 32 further comprising means for supplying said successive pixels of an input video image to said stroke detecting means; and said stroke detecting means comprises binary quantizing means for quantizing a supplied pixel to a first or second value, means for providing a predetermined set of matrix coefficients, and a stroke detecting convoluting filter for convoluting the supplied quantized pixel and its surrounding pixels with said set of matrix coefficients to generate said control data.

34. The apparatus of claim 33 wherein said convolution filter means is coupled to receive said supplied quantized pixel and its surrounding pixels for convolution with the read out set of parameter coefficients to produce said processed pixel.

35. The apparatus of claim 34 wherein each of said sets of parameter coefficients exhibits parameter values for increasing the thickness of said stroke.

36. The apparatus of claim 34 wherein each of said sets of parameter coefficients exhibits parameter values for decreasing the thickness of said stroke.

37. The apparatus of claim 34 wherein said convolution filter means is comprised of plural cascade-connected convolution filters, each coupled to receive a processed pixel under consideration and processed surrounding pixels from a preceding convolution filter for convolution with a preselected set of parameter coefficients to produce a processed output pixel, thereby changing the effective thickness of said stroke as a function of the number of convolution filters connected in cascade.

38. The apparatus of claim 1 wherein said control data means comprises image generating means for generating control data representing a predetermined image pattern.

39. The apparatus of claim 38 wherein said image generating means comprises image pickup means for picking up an image of said predetermined image pattern.

40. The apparatus of claim 39 wherein said predetermined image pattern is a spot pattern; and said parameter generating means is responsive to control data representing said spot pattern to read out a first set of parameter coefficients when said pixel under consideration is located within said spot pattern and to read out a second set of parameter coefficients when said pixel under consideration is located outside said spot pattern.

41. The apparatus of claim 40 wherein said image pickup means generates pattern pixels representing said predetermined image pattern; and said parameter generating means is connected to receive successive pattern pixels supplied thereto in synchronism with the successive pixels received by said convolution filter means from said input video data means.

* * * * *